United States Patent
Rosenberg et al.

(10) Patent No.: US 8,570,762 B2
(45) Date of Patent: Oct. 29, 2013

(54) VARIABLY CONFIGURABLE COMPUTER BUSES

(75) Inventors: Paul Kessler Rosenberg, Sunnyvale, CA (US); Michael Renne Ty Tan, Menlo Park, CA (US); Sagi Varghese Mathai, Berkeley, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 280 days.

(21) Appl. No.: 13/124,097

(22) PCT Filed: Oct. 31, 2008

(86) PCT No.: PCT/US2008/012360
§ 371 (c)(1),
(2), (4) Date: Apr. 13, 2011

(87) PCT Pub. No.: WO2010/050919
PCT Pub. Date: May 6, 2010

(65) Prior Publication Data
US 2011/0205718 A1    Aug. 25, 2011

(51) Int. Cl.
*H01R 9/00* (2006.01)
*G02B 6/43* (2006.01)
(52) U.S. Cl.
CPC ........................................ *G02B 6/43* (2013.01)
USPC .......................................... 361/775; 361/752
(58) Field of Classification Search
CPC .................. G02B 6/43; G06F 1/183

USPC ................ 361/752, 807, 760, 789, 784, 775; 385/89, 88, 53, 92
See application file for complete search history.

(56) References Cited

U.S. PATENT DOCUMENTS

| | | | |
|---|---|---|---|
| 6,659,656 B2 * | 12/2003 | Brezina et al. | 385/92 |
| 6,685,363 B2 * | 2/2004 | Kryzak | 385/89 |
| 6,715,018 B2 * | 3/2004 | Farnworth et al. | 710/300 |
| 6,902,329 B2 | 6/2005 | Monson | |
| 7,209,621 B2 * | 4/2007 | Glebov et al. | 385/129 |
| 2005/0078902 A1 * | 4/2005 | Beausoleil et al. | 385/1 |

FOREIGN PATENT DOCUMENTS

| | | |
|---|---|---|
| JP | 2005-038735 | 2/2005 |
| JP | 2005-056618 | 3/2005 |

OTHER PUBLICATIONS

Hewlett-Packard Development Company, L.P.. PCT International Search Report for Application No. PCT/US2008/012360. Prepared by Korean IPO. Jul. 24, 2009.

* cited by examiner

Primary Examiner — Yuriy Semenenko (57) ABSTRACT

Various embodiments of the present invention are directed to computer buses that can be used to distribute data between components of various computer systems. In one aspect, a computer bus includes multiple opto-electronic engines disposed within a housing and multiple flexible connectors. Each flexible connector extends through an opening in the housing and is coupled at a first end to an opto-electronic engine and at a second to an electronic device. The flexible connectors enable the bus to be placed in different orientations and positions in order to optimize space and connectivity requirements or limitations.

15 Claims, 9 Drawing Sheets

VARIABLY CONFIGURABLE COMPUTER BUSES

TECHNICAL FIELD

Embodiments of the present invention relate generally to computer buses, and in particular, to computer buses that can be placed in different orientations for particular applications.

BACKGROUND

In computer architectures, a bus is a subsystem for transferring data between computer components of a single computer or between computers. Unlike a point-to-point connection, a bus logically connects several peripherals over the same set of signal lines. In other words, each bus typically comprises a set of signal lines that electronically connect devices, such as a CPU and memory. A bus includes an address bus and a data bus. The data bus transfers data whereas the address bus transfers information regarding the physical location of the data or the location of the destination of the data. Buses can be parallel buses, which carry data words in parallel on multiple signal lines, or serial buses, which carry data in bit-serial form. Most computers have both internal and external buses. An internal bus is composed of a set of signal lines printed on a circuit board. The internal bus connects the internal components of a computer. On the other hand, an external bus connects external peripherals to a circuit board.

In recent years, developments in integrated circuit ("IC") technology have shown remarkable progress in reducing the size of computer components, which has led to increases in component densities, decreases in the cross-sectional dimensions of signal lines, and crowding of signal lines into smaller surface areas. As a result, conventional metal signal lines are approaching the fundamental physical limits of their information-carrying capacity. In addition, the relative amount of time needed to traverse printed circuit paths of a bus becomes too long to take full advantage of the high-speed performance offered by smaller components. In other words, as data rates increase, the information carrying capacity of signal lines decreases with a reduction in the size of the signal lines, and closely spaced signal lines cannot pass high speed signals without creating interference or cross talk.

Thus, manufacturers, designers, and users of computing devices have recognized a market for high-speed buses for distributing data between IC components without the surface area and signal-speed constraints inherent in currently employed buses.

SUMMARY

Various embodiments of the present invention are directed to computer buses that can be used to distribute data between components of various computer systems. In one aspect, a computer bus includes multiple opto-electronic engines disposed within a housing and multiple flexible connectors. Each flexible connector extends through an opening in the housing and is coupled at a first end to an opto-electronic engine and at a second to an electronic device. The flexible connectors enable the bus to be placed in different orientations and positions in order to optimize space and connectivity requirements or limitations It is also the case that components other than flexible connectors, such as formed metal traces or elastomeric conductors, could provide electrical connectivity between OE engine and secondary electrical device.

DETAILED DESCRIPTION

Various embodiments of the present invention are directed to computer buses that can be used to distribute data between components of various computer systems, each computer system having different component configurations. A computer system can be a computer with a printed circuit board ("PCB"), a blade server with multiple server blades, or any other system comprising numerous communicating devices. The PCB can be a mother board, a midplane, a back plane, or any type of PCB. In particular, the buses can transfer data between multiple processors, between processors and memory, and between server blades, just to name a few. Bus embodiments are separate components that are coupled to a PCB or components on a PCB via pliable connections that enable the buses to be oriented in different positions in order to optimize space and connectivity requirements or limitations. In other words, the buses are connected to the computer system with pliable connections that enable the buses to be oriented and positioned where space is available.

Figure 1A:
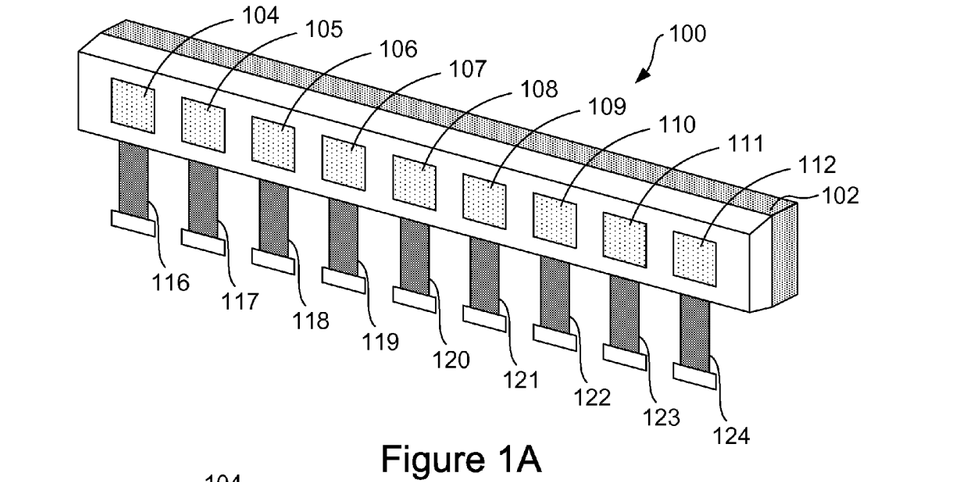
FIGS. 1A-1B show two isometric views of a computer bus configured in accordance with embodiments of the present invention.
Figure 1B:
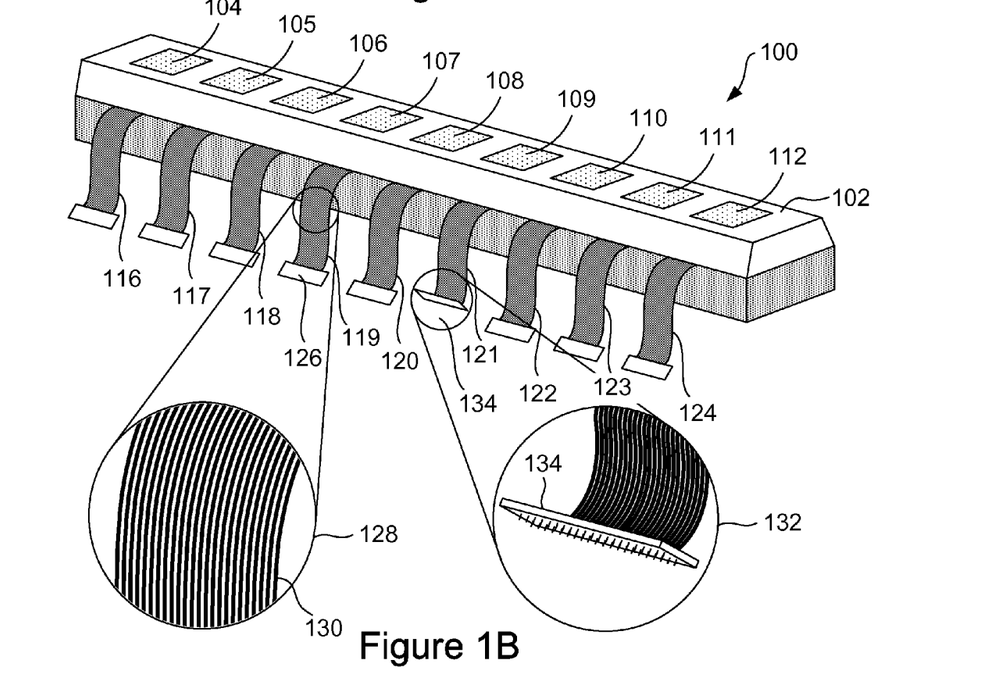

FIGS. 1A-1B show different isometric views of a bus 100 configured in accordance with embodiments of the present invention. The bus 100 includes a housing 102, nine opto-electronic engines 104-112, and nine substantially identically configured pliable electrical flexible connectors 116-124. The housing includes openings in which each flexible connector passes through the housing 102 and is electronically coupled to one opto-electronic engine. Electrical contact pads, such as pad 126, are located at the end of each flexible connector. As shown in FIG. 1B, the separate flexible connectors are pliable and each flexible connector can be bent separately into any number of different configurations. FIG. 1B includes an enlargement 128 of flexible connector 119. Lines, such as line 130, represent individual printed signal lines of the flexible connector 119 connecting the pad 126 to the opto-electronic engine 107. Each flexible connector includes a set of input signal lines dedicated to carrying electrical signals from the pad to an electronically coupled opto-electronic engine and a set of output signal lines dedicated to sending electrical signals from an electronically coupled opto-electronic engine to the pad. Within the housing 102, the opto-electronic engines 104-112 can be optically coupled via optical fibers, waveguides, hollow metal waveguides, or free space. FIG. 1B also includes an enlargement 132 of a pad 134 oriented to reveal male connector pins located on the bottom of the pad. The male connector pins can be inserted into receptacles of a female connector disposed on a PCB. Each connector pin transmits electric signals to one of the signal lines in the flexible connector 121, and each receptacle of a female connector disposed on PCB is in electrical communication with a signal line printed on the PCB. In other embodiments, the pad 134 can be configured as a female connector and the male connector can be disposed on the PCB. In still other embodiments, the pads can also be configured with fasteners that securely fasten the pads to connectors on the PCB.

In certain embodiments, the flexible connectors can be flex circuits. A flexible connector is a type of flexible electronics also known as flexible circuit boards, that can be used to assemble electronic circuits by mounting electronic devices on flexible high-performance plastic substrates, such as polyimide. Additionally, flex circuits can be screen printed silver circuits on polyester. Flex circuits can be electronic assemblies that are fabricated using identical components used for rigid printed circuit boards, allowing the flex circuits to conform to a desired shape, or to flex during use. In other embodiments, the flexible connectors can be formed leads, elastomeric connectors, or pliable ribbon cables, or any other suitable connector.

In certain embodiments, the opto-electronic engines 104-112 can be electrical-to-optical (E/O) converters or optical transmitter arrays. For example, the opto-electronic engines 104-112 can be vertical cavity surface emitting lasers and associated driving electronics. In other embodiments, the opto-electronic engines 104-112 can be optical-to-electrical converters (O/E) or optical receiver arrays. For example, the opto-electronic engines 104-112 can be p-n junction or p-i-n junction photodetectors and associated receiving electronics. In still other embodiments, the opto-electronic engines 104-112 can be transceivers comprising both E/O and O/E converters.

Figure 2:
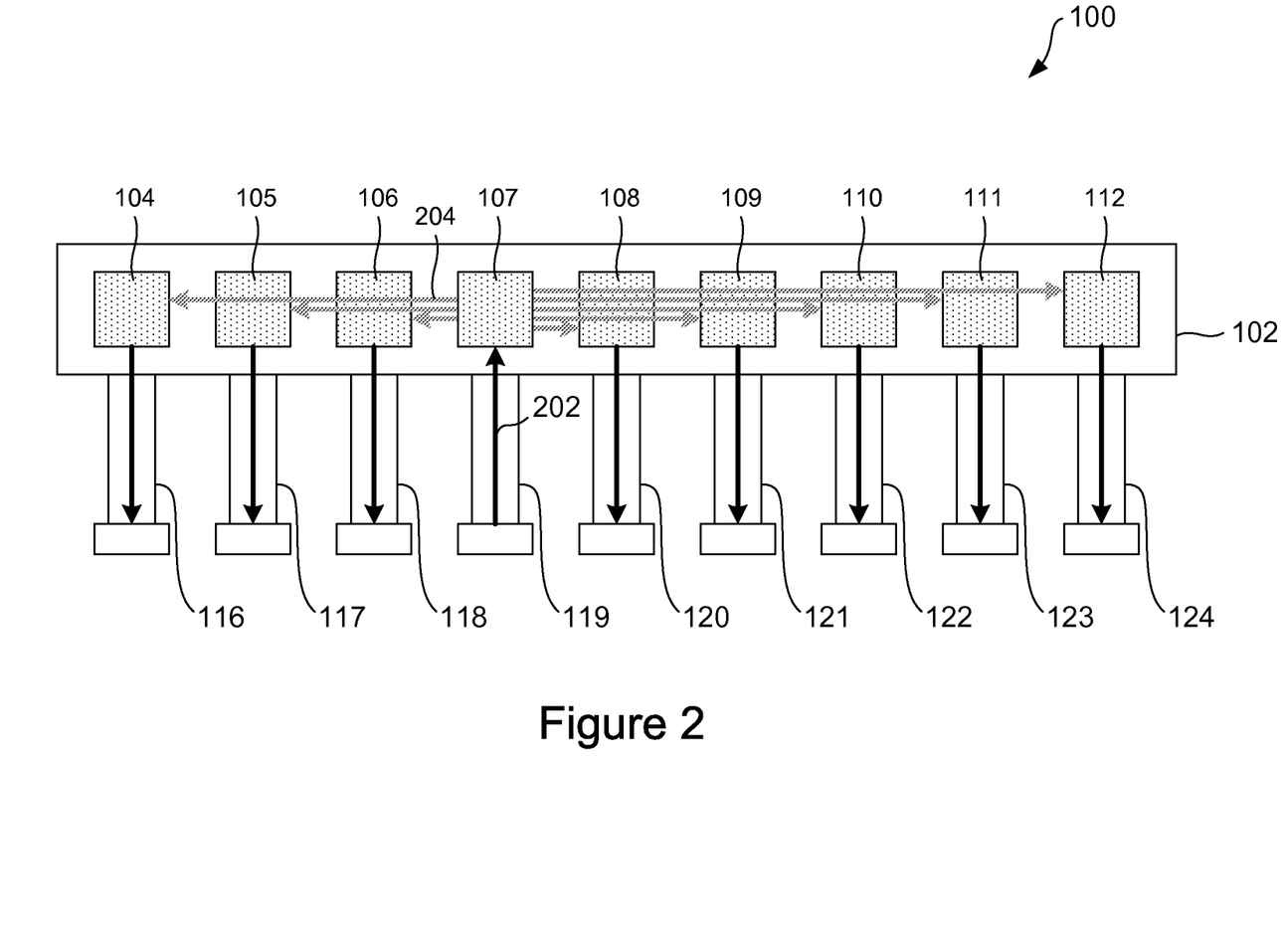
FIG. 2 shows an example of broadcasting information over a computer bus in accordance with embodiments of the present invention.

FIG. 2 shows an example of broadcasting information over the bus 100 in accordance with embodiments of the present invention. As shown in FIG. 2, the opto-electronic engine 107 receives electrical signals over input signal lines on the flexible connector 119, as indicated by directional arrow 202. The opto-electronic engine 107 converts the electrical signals into optical signals that are distributed to each of the opto-electronic engines 104-106 and 108-112, as indicated by directional arrows, such as directional arrow 204. The opto-electronic engines 104-106 and 108-112 each convert the optical signals back into electrical signals that are sent out on the output signal lines of the flexible connectors 116-118 and 120-124.

In other embodiments, the opto-electronic engines can be configured to receive electrical signals encoding data packets, where each data packet includes the address of a particular device destined to receive the information encoded in the electrical signals. An opto-electronic engine receives and converts the electrical signals into optical signals that are optically distributed to the other opto-electronic engines as described above with reference to FIG. 2. The opto-electronic engines receiving the optical signals read the address portions. The opto-electronic engine connected to the device identified in the address portions converts the optical signals back into electrical signals that are sent to the device. Otherwise, the remaining opto-electronic engines discard the optical signals.

The pads located at the ends of the flexible connectors can be electronically coupled to electrical signal lines printed on a PCB or coupled directly to various PCB components. The pliable electrical flexible connectors 116-124 can be bent into any of a number of different configurations enabling the bus 100 to be placed in a number of different orientations and positions relative to the PCB. In addition to the flexible connectors being pliable, the flexible connectors 116-124 are also rigid enough to support the bus 100 in various orientations above a surface and components of the PCB. The orientation of the bus 100 can be selected based on the available space surrounding PCB, the density of PCB components, and any factor that limits the available space around or the available surface area of the PCB.

Figures 3A, 3B, 3C:
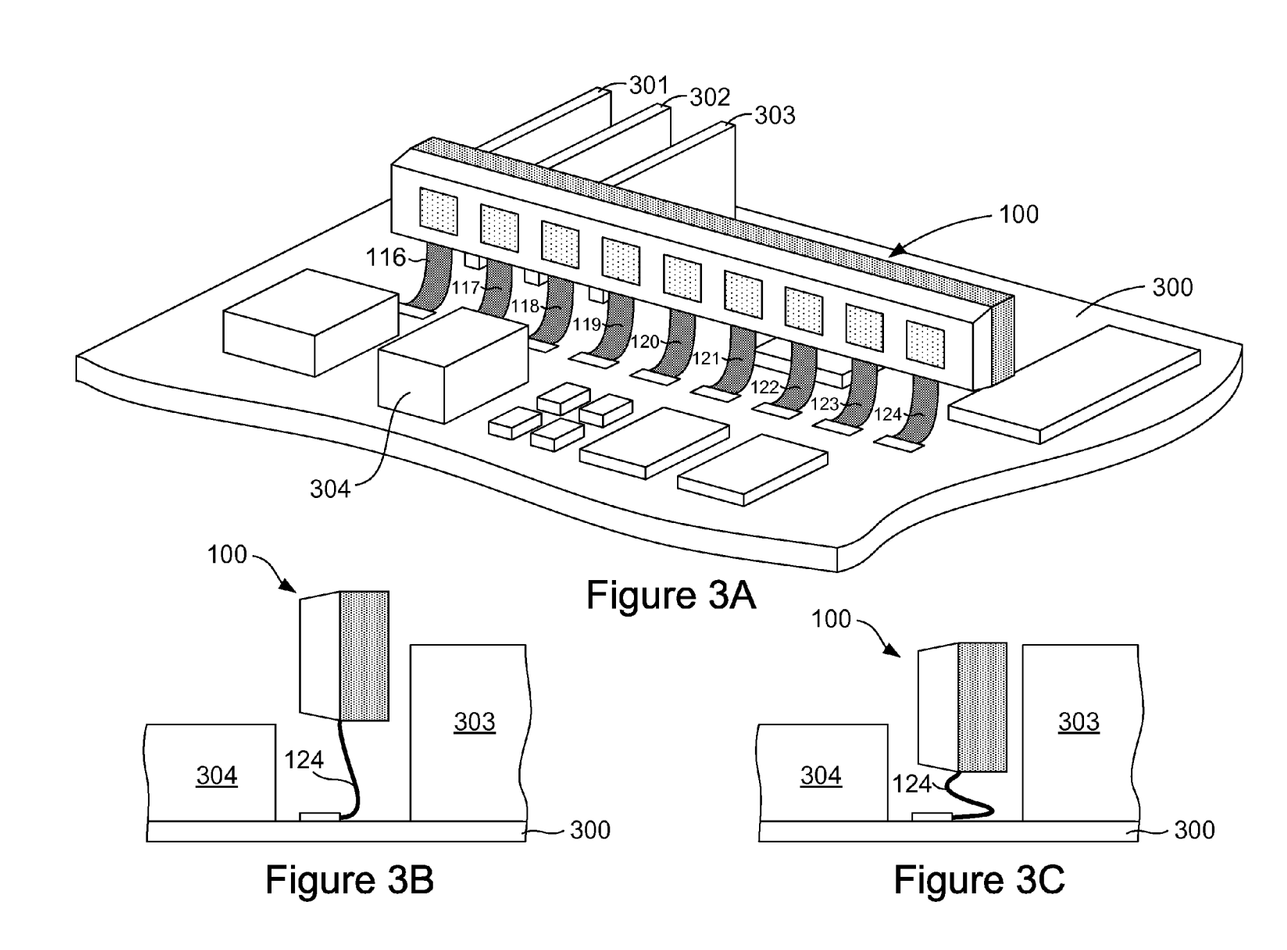
FIG. 3A shows an isometric view of a computer bus in a first orientation in accordance with embodiments of the present invention.
FIGS. 3B-3C show a side view of the bus shown in FIG. 3A in the first orientation in accordance with embodiments of the present invention.

FIGS. 3A-3B show an isometric view and a side view, respectively, of the bus 100 in a first orientation and coupled to a PCB 300 in accordance with embodiments of the present invention. Where space above the PCB 300 is not a limiting factor, the first orientation orients and positions the bus 100 between components 301-304 extending above the PCB surface. The bus 100 pads 116-125 are coupled directly to signal lines (not shown) printed on the PCB 300 surface. The bus 100 provides communication between components coupled to the PCB 300, such as components 301-304. As shown in FIGS. 3A-3B, the flexible connectors are bent to orient and position the PCB 300 between high profile components, such as components 303 and 304. When the available space above the high profile components is also limited, the flexible connectors can be further bent so that bus 100 is positioned closer to the surface of the PCB 300, as shown in the side view of FIG. 3C in accordance with embodiments of the present invention.

Figures 4A, 4B:
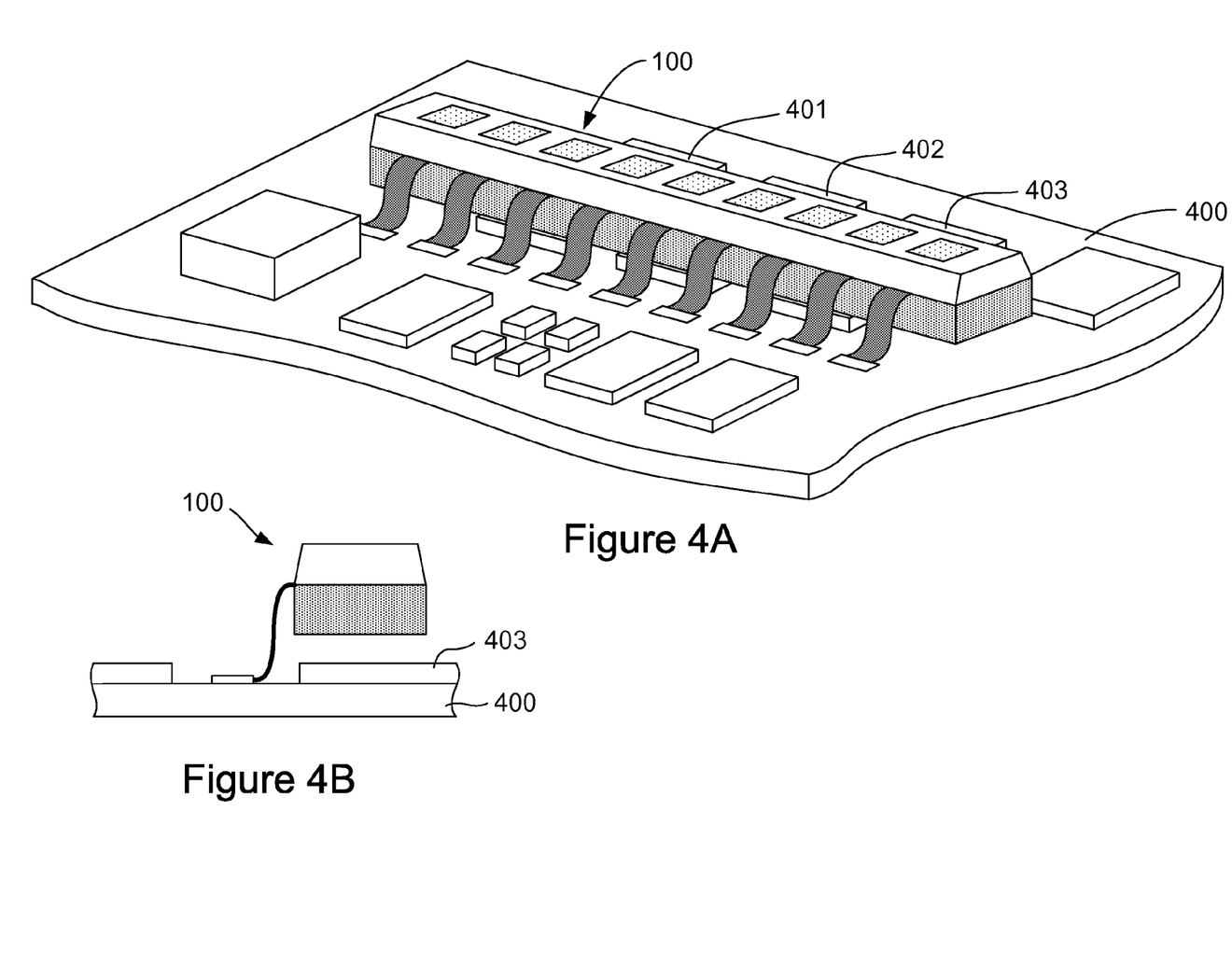
FIGS. 4A-4B show an isometric view and side view, respectively, of a computer bus in a second orientation in accordance with embodiments of the present invention.

FIGS. 4A-4B show an isometric view and a side view, respectively, of the bus 100 in a second orientation and coupled to a PCB 400 in accordance with embodiments of the present invention. Where space above the PCB 400 is a limiting factor, the second orientation orients and suspends the bus 100 above components coupled to the PCB 400. The bus 100 pads 116-125 are coupled directly to signal lines (not shown) printed on the PCB 400 surface and provide communication between components coupled to the PCB 400. The flexible connectors are bent into an S-shape so that the bus 100 is oriented and suspended above components 401-403.

Figure 5A:
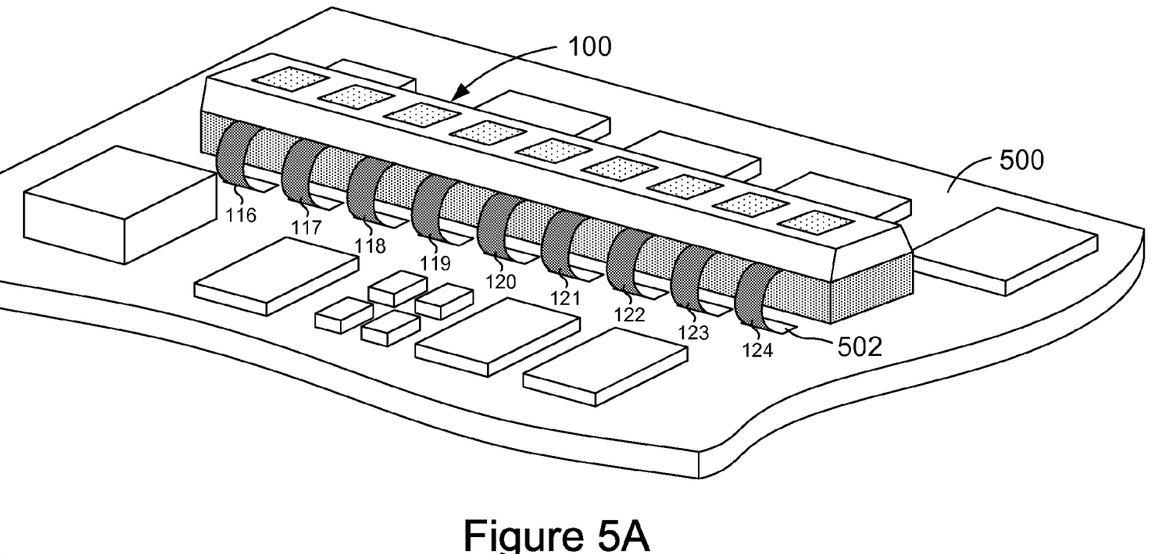
FIGS. 5A-5B show an isometric view and side view, respectively, of a computer bus in a third orientation in accordance with embodiments of the present invention.
Figure 5B:
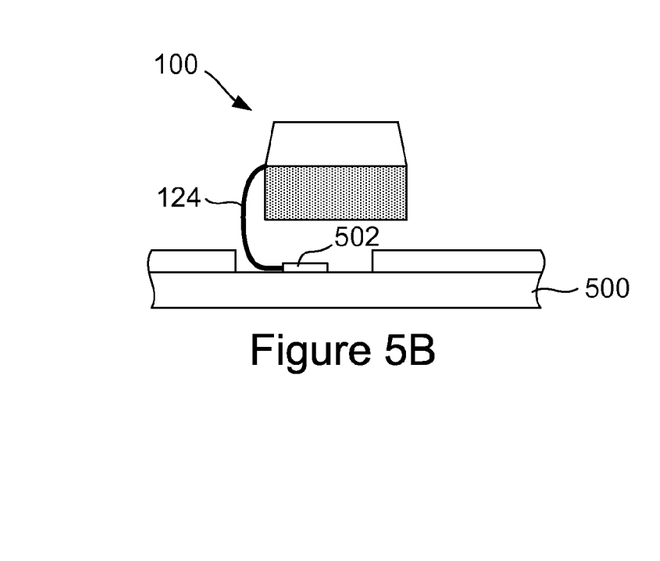

FIGS. 5A-5B show an isometric view and a side view, respectively, of the bus 100 in a third orientation and coupled to a PCB 500 in accordance with embodiments of the present invention. Where space above the PCB 500 is a limiting factor, the third orientation orients and suspends the bus 100 above the pads coupled to the surface of a PCB 500. The bus 100 pads 116-125 are coupled directly to signal lines (not shown) printed on the PCB 500 surface and provide communication between components coupled to the PCB 500. However, note that in this orientation, the pads are inverted relative to the orientation of the pads in the first and second orientations, described above with reference to FIGS. 3-4. As shown in FIGS. 5A-5B, the inverted attachment of the pads and the C-shaped arrangement of the flexible connectors enable the bus 100 to be suspended above and in close proximity to pads that are coupled to the surface of the PCB 500.

Figures 6A, 6B:
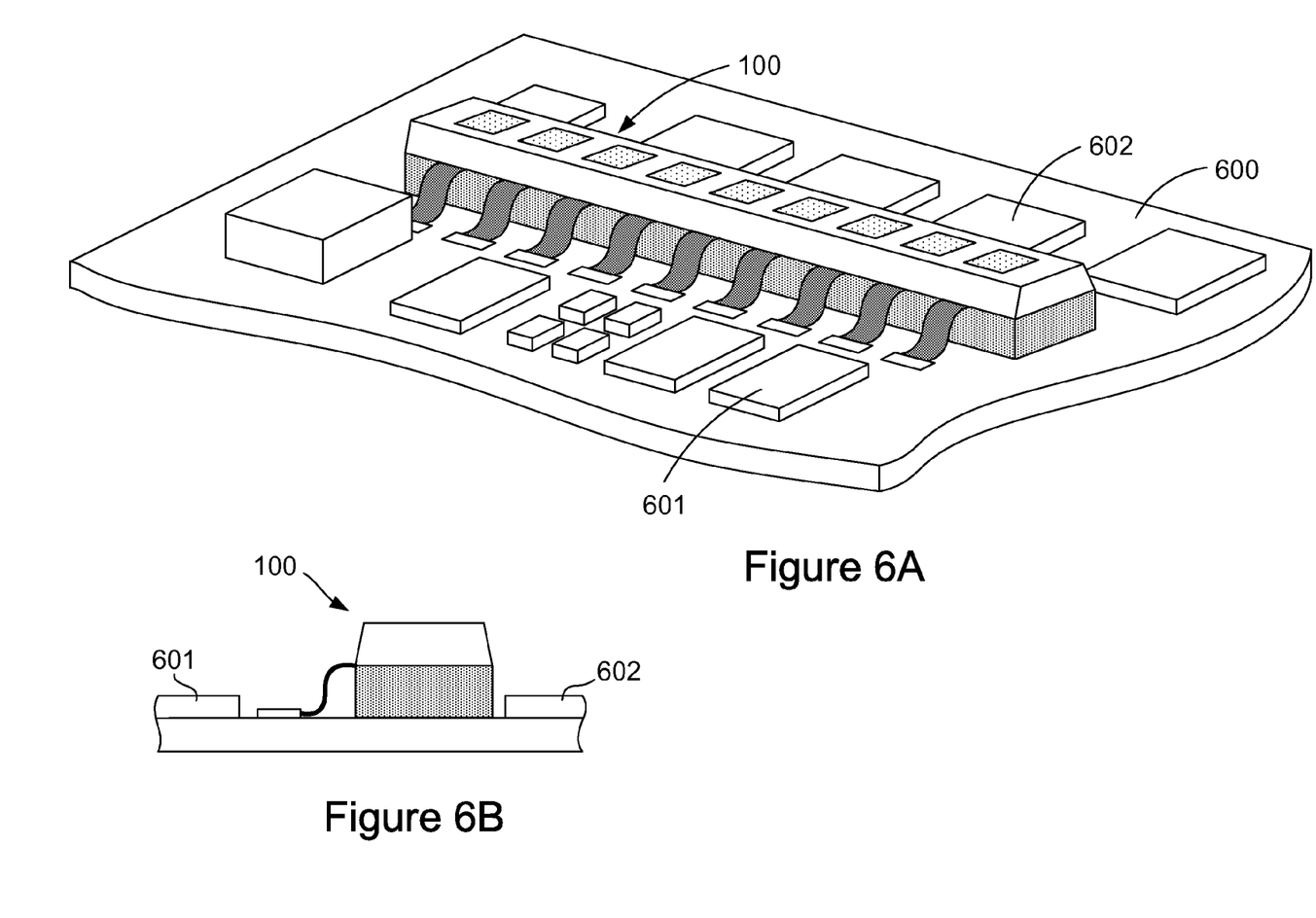
FIGS. 6A-6B show an isometric view and side view, respectively, of a computer bus in a fourth orientation in accordance with embodiments of the present invention.

FIGS. 6A-6B show an isometric view and a side view, respectively, of the bus 100 in a fourth orientation and coupled to a PCB 600 in accordance with embodiments of the present invention. Where space above the PCB 600 is a limiting factor and there is sufficient space between components coupled to the PCB 600, the fourth orientation orients and places the bus 100 on the surface of the PCB 600. The bus 100 pads 116-125 are coupled directly to signal lines (not shown) printed on the PCB 600 surface and provide communication between components coupled to the PCB 600. The flexible connectors 104-112 are bent into an S-shape and the bus 100 is placed directly on the surface of the PCB 600 between components 601 and 602.

Figures 7A, 7B:
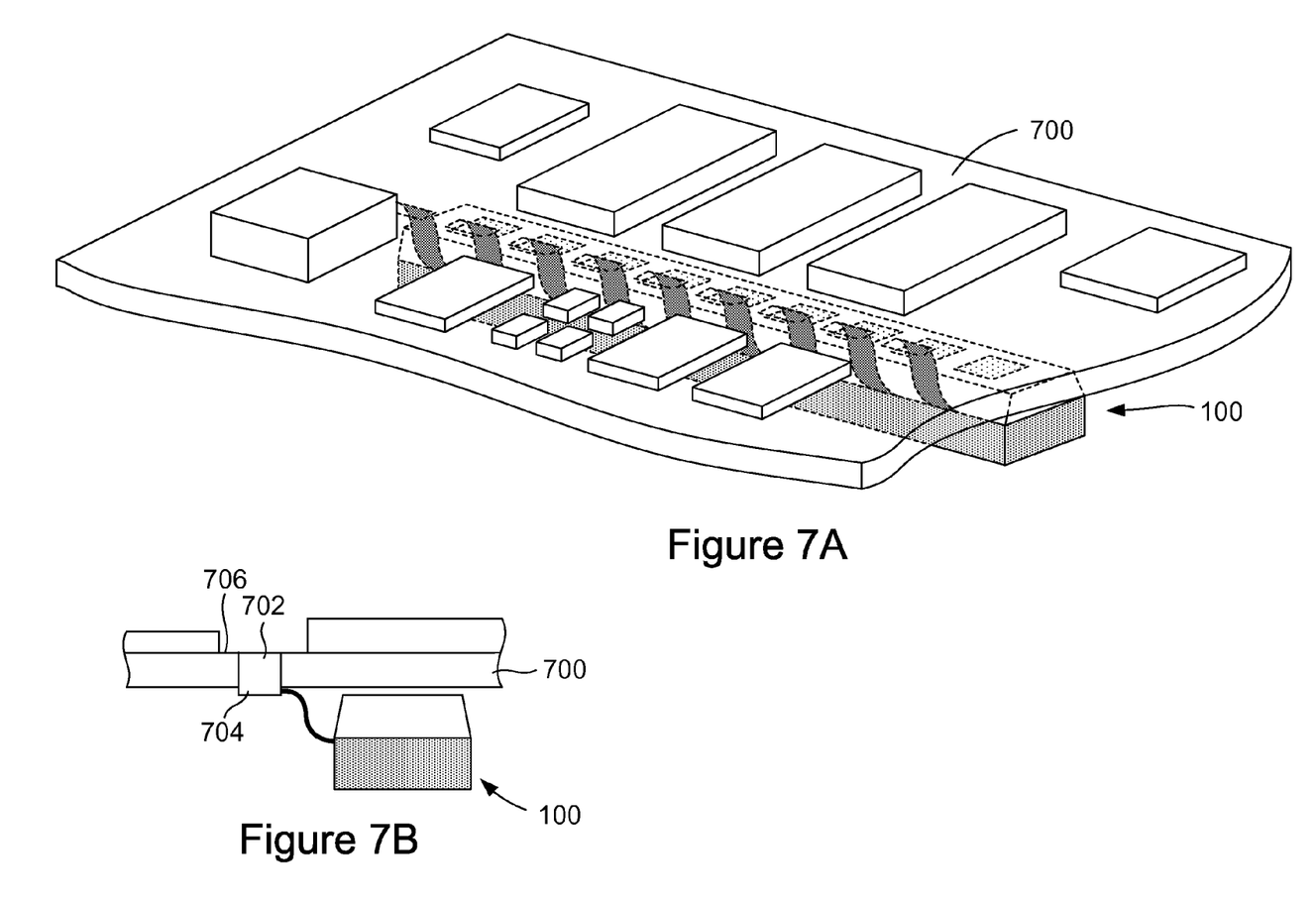
FIGS. 7A-7B show an isometric view and side view, respectively, of a computer bus in a fifth orientation in accordance with embodiments of the present invention.

Embodiments of the present invention are not limited to attaching the bus 100 to the same surface of the PCB to which the components are coupled. In other embodiments, the PCB can be configured so that the bus 100 is coupled to a surface opposite the surface to which the components are coupled. FIGS. 7A-7B show an isometric view and a side view, respectively, of the bus 100 in a fifth orientation and coupled to a PCB 700 in accordance with embodiments of the present invention. Where space above the surface to which the components are coupled is limited, the fifth orientation enables the bus 100 to be coupled to a surface of the PCB 700 opposite the surface supporting the components. The side view reveals that the PCB 700 is configured with a connector 702 spanning the height of the PCB 700 enabling a pad 704 to be electronically coupled to signal lines printed on the PCB 700 surface 706. The flexible connectors are bent so that the bus 100 is placed in close proximity the PCB 700. Note that configuring the PCB 700 to attach the bus 100 to the surface opposite the surface to which the components are coupled allows for the components of the PCB 700 to be placed in close proximity to one another.

Figure 8:
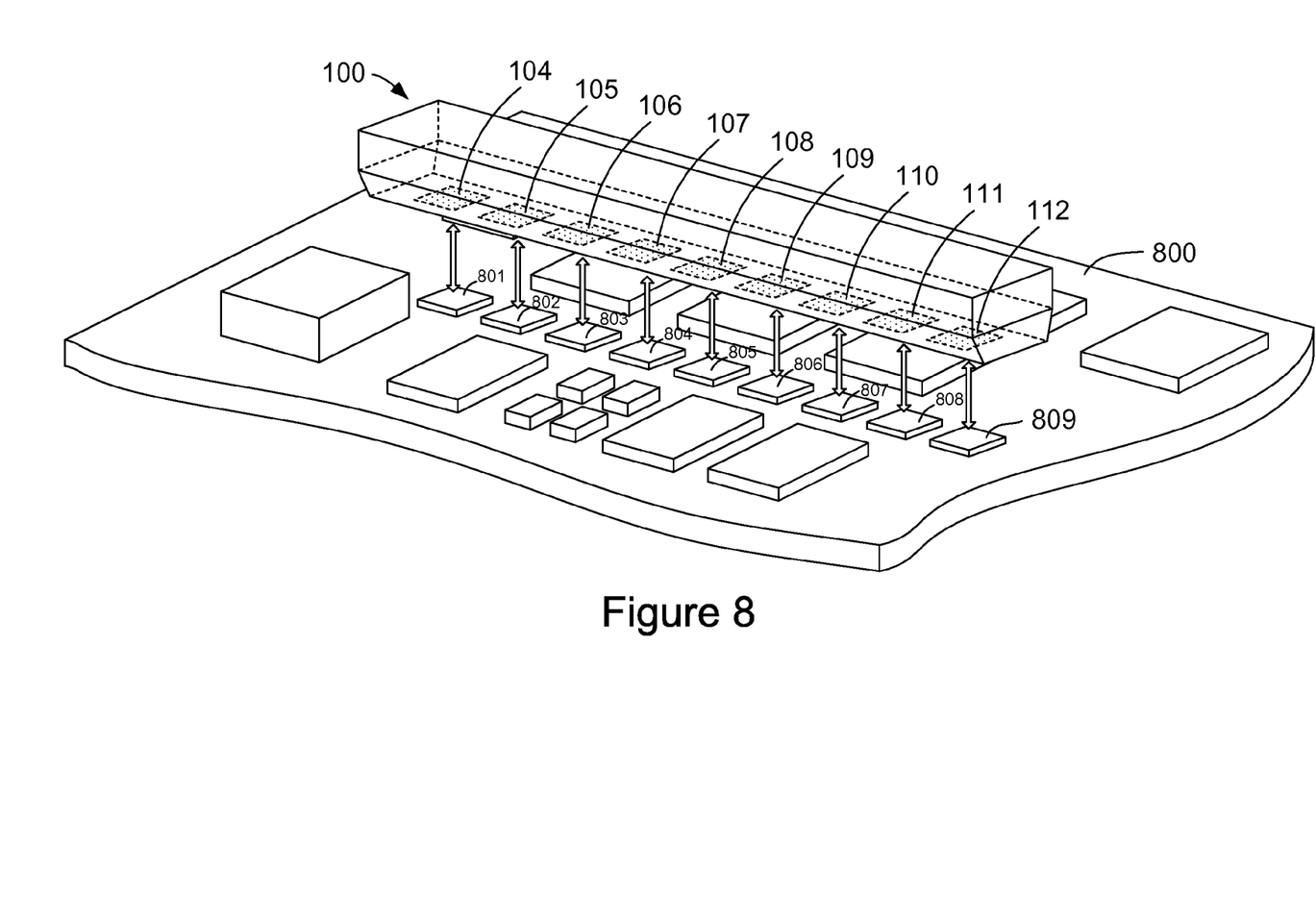
FIG. 8 shows an isometric view of a computer bus in a sixth orientation in accordance with embodiments of the present invention.

In other embodiments, the opto-electronic engines 104-112 can be configured to connect directly to ports disposed on the surface of a PCB. FIG. 8 shows an exploded isometric view of the bus 100 in a sixth orientation in accordance with embodiments of the present invention. As shown in the example of FIG. 8, the PCB 800 includes ports 801-809. The housing 102 can be configured to include openings exposing each of the opto-electronic engines 104-112, and the opto-electronic engines can be configured to connect to the ports 801-809. As a result, the bus 100 can be inverted and each of the opto-electronic engines 104-112 connected directly to the ports 801-809, thus eliminating the need to connect the pads of the bus 100 to the PCB 800.

Figure 9:
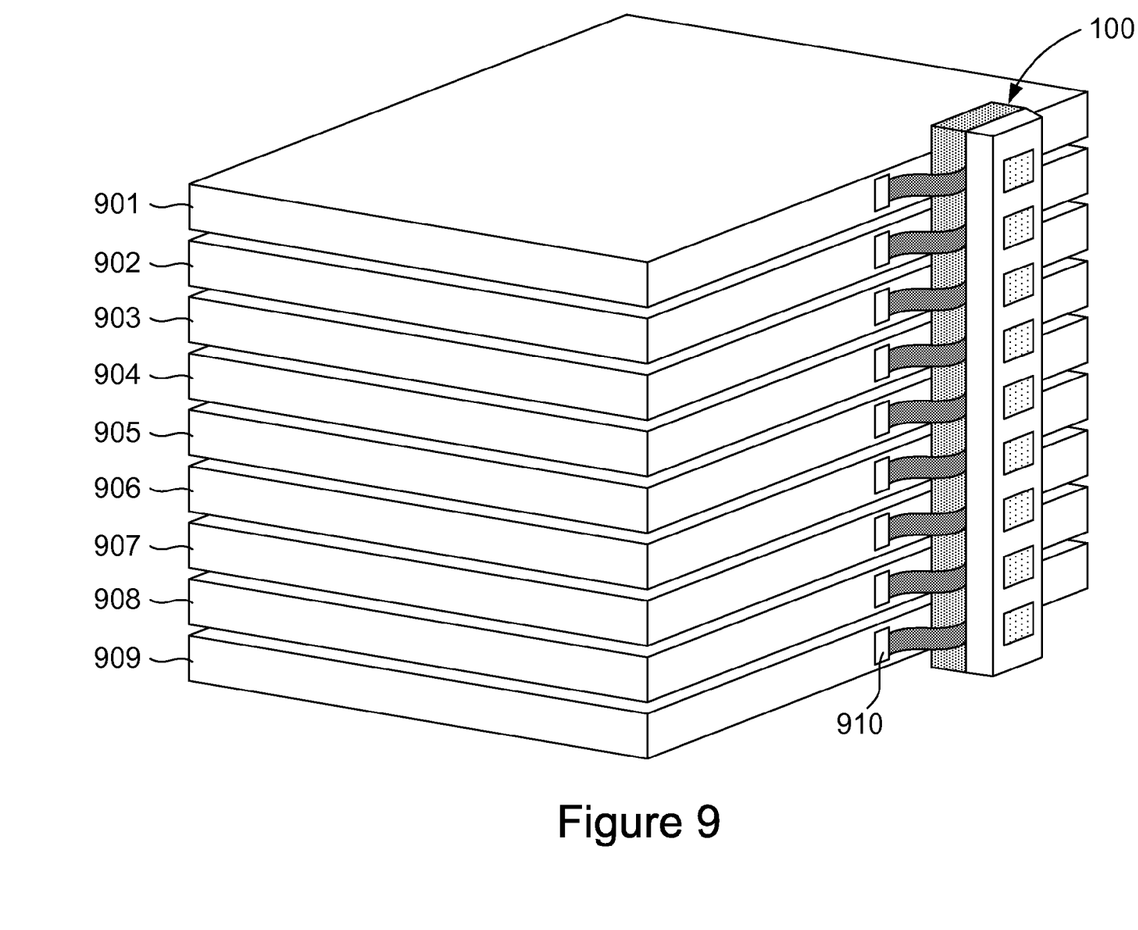
FIG. 9 shows a bus coupled to server blades of a blade server in accordance with embodiments of the present invention.

Free space inside computer system racks and blade server enclosures is often limited. A relatively large component system, such as a data bus, may be difficult to accommodate in the crowded interior of the computer system. Embodiments of the present invention are not limited to attaching the bus 100 to a single PCB as described above. The bus 100 can also be coupled to the edges of multiple PCBs in order to provide communication between the PCBs. Thus, the bus 100 can replace a backplane or at least compliment the communications provided by a backplane. The PCBs can be mother boards or individual server blades in a blade server. FIG. 9 shows a bus 100 coupled to nine server blades 901-909 of a blade server in accordance with embodiments of the present invention. As shown in FIG. 9, the nine server blades 901-909 are shown without the blade server enclosure. Each server blade is electronically coupled to a pad of bus 100. For example, pad 910 is coupled to the server blade 909. The bus 100 provides more flexibility than a typical midplane or backplane. For example, the server blades of a blade server can vibrate during operation and the server blades may not be uniformly spaced within the server blade enclosure. Because the flexible connectors are also flexible, flexible connectors tolerate individual server blade vibrations without interrupting communications over the bus 100, and the pliability of the cables enable the pads to be connected to ports even though the ports are not evenly spaced.

Although the present invention has been described in terms of particular embodiments, it is not intended that the invention be limited to these embodiments. Modifications will be apparent to those skilled in the art. For example, the bus 100 is not limited to nine opto-electronic engines and nine flexible connectors. The number of opto-electronic engines and flexible connectors can vary depending on the number of components or server blades the bus is configured to serve. In other embodiments, the flexible connectors can be replaced by pliable optical flexible connectors, where the individual wires of the electrical flexible connectors 116-124 are replaced by optical fibers.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A computer bus comprising:
multiple opto-electronic engines disposed within a housing, each opto-electronic engine being coupled to at least one other opto-electronic engine within the housing; and
multiple flexible connectors, each flexible connector extending through an opening in the housing and coupled at a first end to an opto-electronic engine within the housing and at a second end to an electronic device outside the housing, wherein the flexible connectors enable the bus to be oriented in different positions in order to optimize space and connectivity requirements or limitations.

2. The bus of claim 1 wherein each flexible connector further comprise a set of input signal lines dedicated to carrying electrical signals from the electronic device to a coupled opto-electronic engine and a set of output signal lines dedicated to sending electrical signals from the coupled opto-electronic engine to the electronic device.

3. The bus of claim 1 further comprising multiple pads, wherein each pad is coupled to the second end of a flexible connector and coupled to the electronic device.

4. The bus of claim 1 wherein the multiple opto-electronic engines are coupled within the housing via at least one of:
optical fibers;
waveguides;
hollow metal waveguides; or
free space.

5. The bus of claim 1 wherein at least one of the multiple opto-electronic engines is to receive electrical signals from a flexible connector, convert the electrical signals into optical signals, and broadcast the optical signals to the other opto-electronic engines.

6. The bus of claim 1 wherein each of the multiple opto-electronic engines is to receive optical signals and convert the optical signals in to electrical signals that are sent to the electronic device.

7. The bus of claim 1 wherein the electronic device further comprises one of:
   a printed circuit board; and
   a server blade.

8. The bus of claim 1 wherein the housing includes multiple openings, each opening aligned with one of the opto-electronic engines such that each of the multiple opto-electronic engines can be coupled through an opening directly to an electronic device.

9. The bus of claim 1 wherein the multiple flexible connectors further comprises at least one of:
   flex circuits;
   formed leads;
   elastomeric connectors; or
   pliable ribbon cables.

10. The bus of claim 1 wherein the flexible connectors enable the bus to be oriented in different positions further comprises orienting and positioning the bus between components extending above an electronic device surface.

11. The bus of claim 1 wherein the flexible connectors enable the bus to be oriented in different positions further comprises orienting and suspending the bus above components coupled to the electronic device.

12. The bus of claim 1 wherein the flexible connectors enable the bus to be oriented in different positions further comprises orienting and suspending the bus above multiple pads, wherein each pads couples a flexible connector to a surface of the electronic device.

13. The bus of claim 1 wherein the flexible connectors enable the bus to be oriented in different positions further comprises orienting and placing the bus on a surface of the electronic device.

14. The bus of claim 1 wherein the flexible connectors enable the bus to be oriented in different positions further comprises coupling to the bus to a surface opposite the surface to which components of the electronic device are coupled.

15. An apparatus, comprising:
   a housing having two or more openings;
   two or more opto-electronic engines disposed within the housing, each opto-electronic engine being coupled to at least one other opto-electronic engine within the housing;
   at least one electronic device disposed outside the housing; and
   two or more flexible connectors, each connector having a first end coupled to one of the two or more opto-electronic engines and a second end coupled to one of the at least one electronic device,
   wherein each flexible connector extends through one of the two or more openings.

* * * * *

UNITED STATES PATENT AND TRADEMARK OFFICE
CERTIFICATE OF CORRECTION

PATENT NO.        : 8,570,762 B2
APPLICATION NO.   : 13/124097
DATED             : October 29, 2013
INVENTOR(S)       : Paul Kessler Rosenberg et al.

Page 1 of 1

It is certified that error appears in the above-identified patent and that said Letters Patent is hereby corrected as shown below:

In the Claims

In column 7, line 3, in Claim 6, delete "in to" and insert -- into --, therefor.

Signed and Sealed this
First Day of April, 2014

Michelle K. Lee
*Deputy Director of the United States Patent and Trademark Office*